US010317555B2

(12) United States Patent
Li et al.

(10) Patent No.: US 10,317,555 B2
(45) Date of Patent: Jun. 11, 2019

(54) METHOD OF MINIMIZING TOOL RESPONSE FOR DOWNHOLE LOGGING OPERATIONS

(71) Applicant: Halliburton Energy Services, Inc., Houston, TX (US)

(72) Inventors: Wei Li, Singapore (SG); Ruijia Wang, Singapore (SG); Arthur Cheng, Sugar Land, TX (US); Glenn Andrew Wilson, Singapore (SG); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 15/517,499

(22) PCT Filed: Jan. 19, 2016

(86) PCT No.: PCT/US2016/013851
§ 371 (c)(1),
(2) Date: Apr. 6, 2017

(87) PCT Pub. No.: WO2017/127045
PCT Pub. Date: Jul. 27, 2017

(65) Prior Publication Data
US 2017/0371058 A1 Dec. 28, 2017

(51) Int. Cl.
G01V 1/46 (2006.01)
G01V 1/40 (2006.01)
(Continued)

(52) U.S. Cl.
CPC ............... G01V 1/46 (2013.01); E21B 47/00 (2013.01); E21B 47/14 (2013.01); G01V 1/282 (2013.01);
(Continued)

(58) Field of Classification Search
CPC . G01V 1/46; G01V 1/50; G01V 1/282; G01V 1/40; G01V 2210/59;
(Continued)

(56) References Cited

U.S. PATENT DOCUMENTS 4,633,449 A   12/1986  Ingram et al.
5,377,116 A   12/1994  Wayne et al.
(Continued)

FOREIGN PATENT DOCUMENTS

WO   2015065339   5/2015

OTHER PUBLICATIONS

International Search Report and Written Opinion of PCT Application No. PCT/US2016/013851 dated Sep. 12, 2016: pp. 1-11.
(Continued)

Primary Examiner — Ian J Lobo
(74) Attorney, Agent, or Firm — Chamberlain Hrdlicka

(57) ABSTRACT

A method of obtaining an equivalent tool model includes obtaining a set of known well data, in which the known well data includes sensor data measured by a logging tool and an actual dispersion response, and the logging tool has an actual tool size. The method also includes obtaining one or more well parameters from the known well data, and inputting the one or more well parameters and a model tool size into a rigid tool model. The method further includes obtaining an estimated dispersion response from the rigid tool model, and fitting the estimated dispersion response to the actual dispersion response by adjusting the model tool size.

21 Claims, 3 Drawing Sheets

(51) Int. Cl.
*E21B 47/00* (2012.01)
*E21B 47/14* (2006.01)
*G01V 1/28* (2006.01)
*G01V 1/50* (2006.01)

(52) U.S. Cl.
CPC ............... *G01V 1/40* (2013.01); *G01V 1/50* (2013.01); *G01V 2210/54* (2013.01); *G01V 2210/59* (2013.01); *G01V 2210/626* (2013.01)

(58) Field of Classification Search
CPC .......... G01V 2210/626; G01V 2210/54; E21B 47/14; E21B 47/00
See application file for complete search history.

(56) References Cited

U.S. PATENT DOCUMENTS

| | | |
|---|---|---|
| 5,675,147 A | 10/1997 | Ekstrom et al. |
| 5,729,462 A | 3/1998 | Newkirk et al. |
| 5,852,235 A | 12/1998 | Pavone et al. |
| 5,862,513 A | 1/1999 | Mezzatesta et al. |
| 6,591,194 B1 | 7/2003 | Yu et al. |
| 6,671,623 B1 | 12/2003 | Li |
| 6,831,640 B2 | 12/2004 | Matusik et al. |
| 6,885,943 B2 | 4/2005 | Bittar et al. |
| 6,920,082 B2 | 7/2005 | Tang |
| 7,529,152 B2 | 5/2009 | Sinha et al. |
| 7,660,196 B2 | 2/2010 | Saiki et al. |
| 7,830,744 B2 | 11/2010 | Wu et al. |
| 8,589,136 B2 | 11/2013 | Ertas et al. |
| 8,775,084 B2 | 7/2014 | Rabinovich et al. |
| 2004/0001389 A1 | 1/2004 | Tang |
| 2005/0256642 A1 | 11/2005 | Barber et al. |
| 2007/0088456 A1 | 4/2007 | Schmitz et al. |
| 2009/0225627 A1 | 9/2009 | Sinha et al. |
| 2011/0134719 A1 | 6/2011 | Kinoshita et al. |
| 2015/0219780 A1 | 8/2015 | Zeroug et al. |
| 2016/0082667 A1* | 3/2016 | Donderici ............ G01V 13/00 700/98 |

OTHER PUBLICATIONS

Cheng et al., "Elastic wave propagation in a fluid-filled borehole and synthetic acoustic logs," Geophysics, Jul. 1981, vol. 46(7): pp. 1042-1053.

Tang et al., "Effects of a Logging Tool on the Stoneley Waves in Elastic and Porous Boreholes," The Log Analyst, Sep.-Oct. 1993: pp. 46-56.

Tang et al., Chapter 2: "Elastic wave propagation in boreholes," Quantitative Borehole Acoustic Methods, Handbook of Geophysical Exploration Seismic Exploration, Helbig and Treitel, eds., Elsevier Ltd., San Diego, 2004, vol. 24: pp. 31-37.

\* cited by examiner

METHOD OF MINIMIZING TOOL RESPONSE FOR DOWNHOLE LOGGING OPERATIONS

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Acoustic logging operations are used to collect data regarding the rock formation around a borehole. Typically, an acoustic logging tool in the form of a wireline tool or logging while drilling tool is positioned within the borehole to collect such data. The acoustic logging tool emits multi-order acoustic signals in multiple directions at the surrounding borehole wall or formation. The acoustic signal propagates through the borehole and formation. The received signal includes properties (e.g., attenuation and phase) caused by the formation properties, and thus characterizes the formation.

The presence of the logging tool modifies the acoustic wave excitation and propagation characteristics through the borehole and formation. Thus, the data obtained from the received acoustic signals may be distorted by the logging tool. In order to accurately determine formation properties, the effects of the logging tool need to be accounted for in data analysis. This can be done by generating an equivalent tool model. An equivalent tool model is mathematical representation of the logging tool and thus can be used to filter out the effects of the logging tool.

BRIEF DESCRIPTION OF THE DRAWINGS

For a detailed description of the embodiments of the invention, reference will now be made to the accompanying drawings in which.

DETAILED DESCRIPTION

The present disclosure provides methods and systems for constructing and using an equivalent tool model utilizing a reduced rigid tool model.

Figure 1:
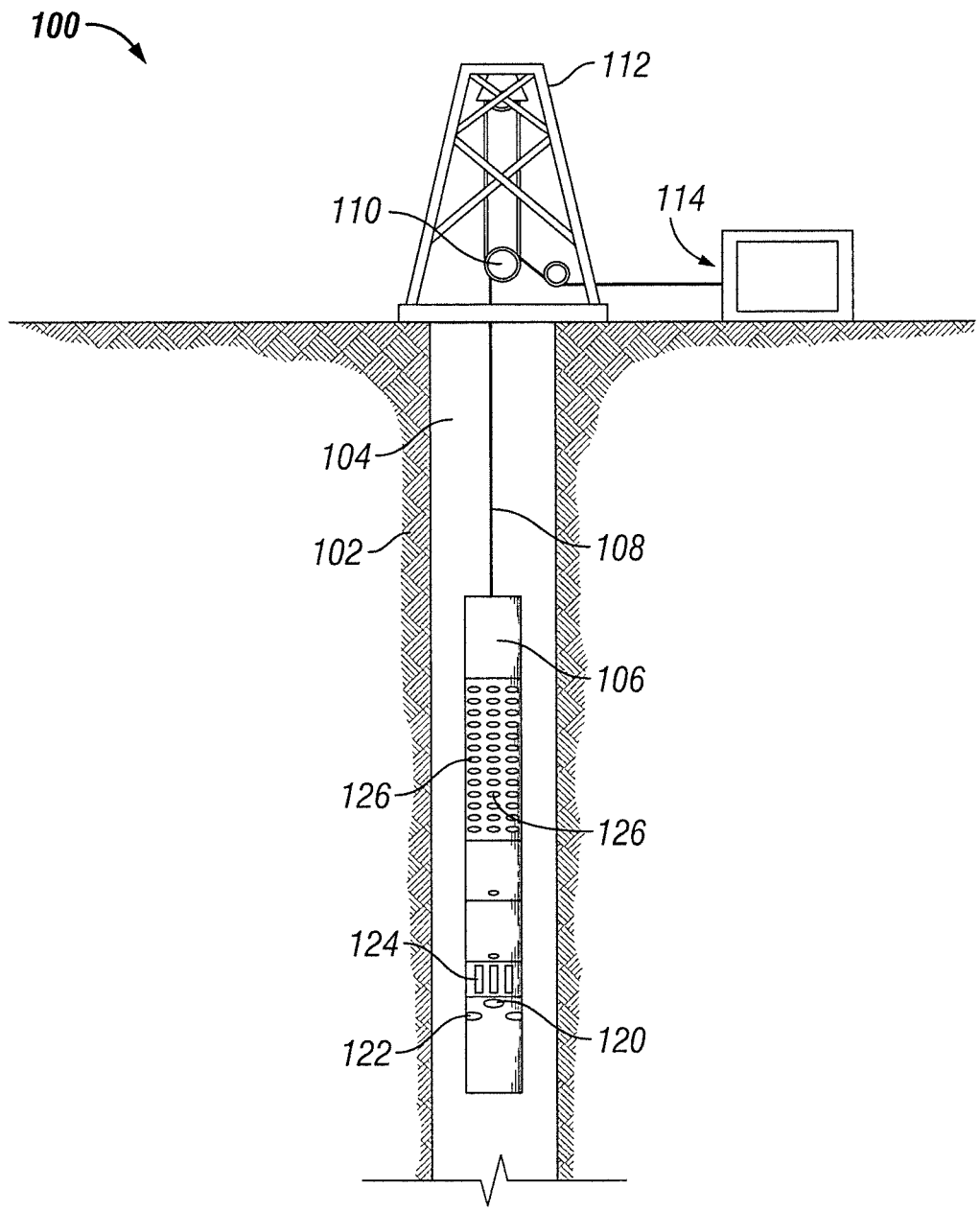
FIG. 1 illustrates a logging system with a logging tool suspended in a borehole.
Figure 2:
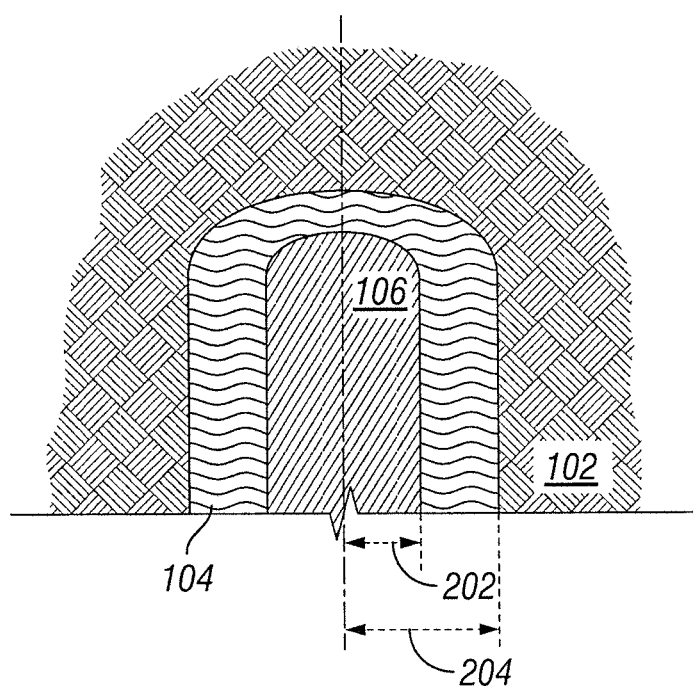
FIG. 2 is a cross-sectional diagram of the logging tool in the borehole.

Referring to the drawings, FIG. 1 illustrates a logging system 100 with a logging tool 106 suspended in a borehole 104. The borehole 104 is formed in a subsurface formation 102. The logging tool 106 is suspended from a wireline cable 108 and may have optional centralizers (not shown). The logging tool 106 may also be conveyed downhole via coiled tubing, slickline, piping, downhole tractor, or any combination thereof. The wireline cable 108 extends from the borehole over a sheave wheel 110 on a derrick 112 to a winch forming part of surface equipment 114. The tool 106 may include any of many means for detecting and indicating tool orientation, such as magnetometers. The tool 106 also includes one or more types of sensors for detecting well conditions. The tool 106 further includes processing and interfacing circuitry configured to sample, amplify, and digitize the data received from the sensors for transmission to the surface equipment 114 via the cable 108. The surface equipment 114 is configured to generate and/or provide electrical power and control signals for coordinating operation of the tool 106. The electrical power and/or control signals may be communicated via the cable 108 to circuitry provided within the tool 106. The logging tool 106 may be a wireline logging device as illustrated in FIG. 2. The logging tool 106 may also be any other type of suitable logging device, including a logging while drilling (LWD) device.

In some embodiments, the logging tool 106 includes one or more multi-pole transmitters 120, dipole transmitters 122, and monopole transmitters 124 capable of exciting and emitting compressional, shear, Stoneley, and flexural waves. The logging tool 106 also includes a plurality of receivers 126 arranged on the logging tool spaced from the transmitters configured to receive as data, waves from the borehole. The receivers may include one or more transducer-based devices such as hydrophones. In some embodiments, the receivers 126 are mounted around the circumference of the tool 106 at regular intervals.

Placing the logging tool 106 within the borehole 104 is essential in obtaining the desired borehole 104 data. However, the presence of the logging tool 106 modifies the excitation and propagation characteristics of the acoustic waves from the borehole 104. Thus, in order to capture formation characteristics, the effects of the logging tool 106, called tool response, need to be quantified and removed. This can be done by constructing an equivalent tool model which simulates the tool response. The equivalent tool mode can then be used when performing quantitative interpretation such as vertical transverse isotropy (VTI) analysis, borehole tomography, permeability analysis, among others. The present disclosure introduces a method of constructing, testing, and refining an equivalent tool model. FIG. 2 illustrates a diagram of the logging tool 106 in the borehole 104, in which the logging tool 106 has a radius 202 and the borehole 104 has a radius 204.

Figure 3:
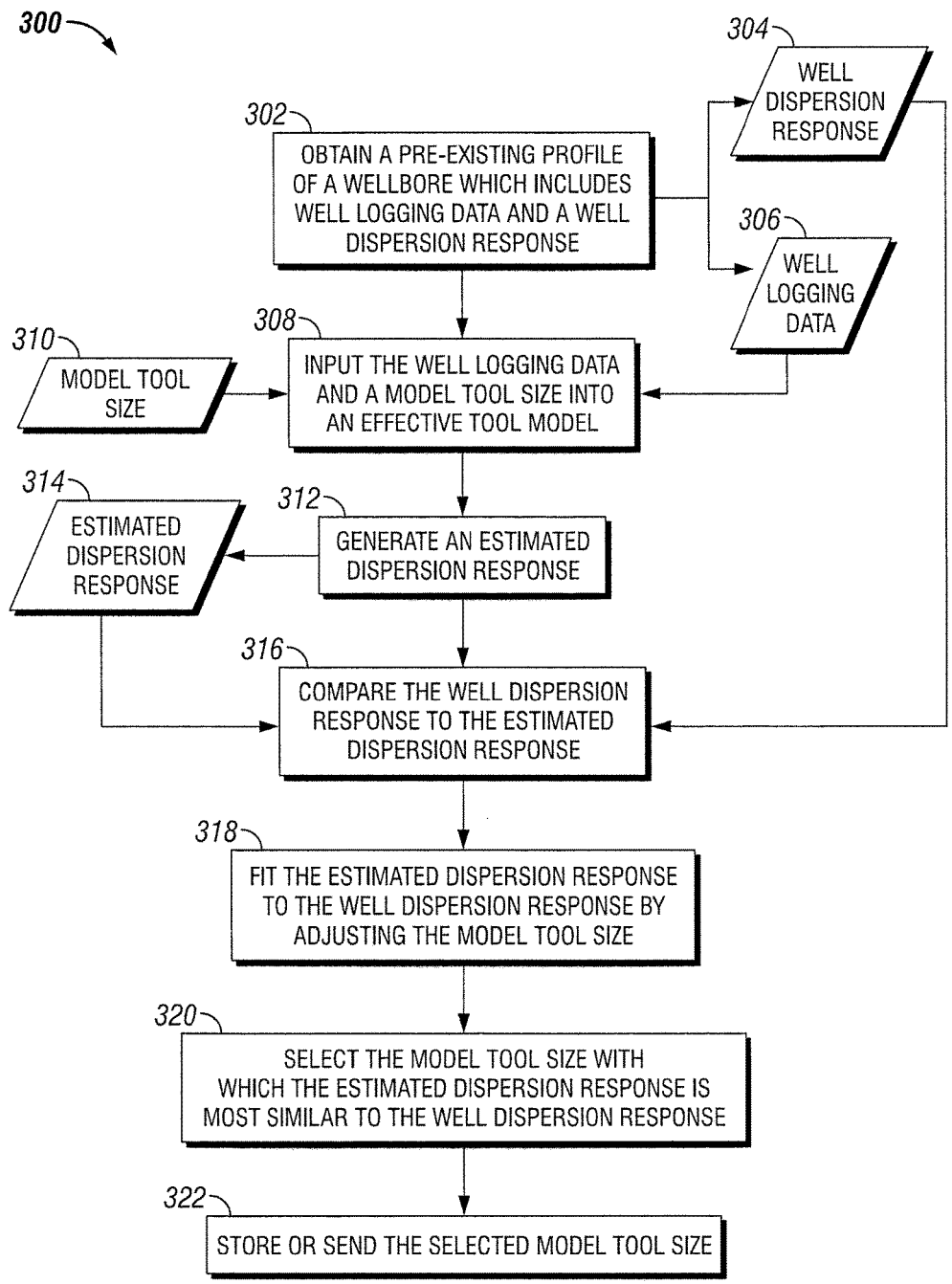
FIG. 3 is a flowchart of a method of constructing an equivalent tool model.

FIG. 3 is a flowchart illustrating a method 300 of processing oil and gas well logging data by finding a model tool size for use in an equivalent tool model, which is a mathematical representation of the logging tool and can be used to filter out the effects of the logging tool from the well logging data. The method 300 includes obtaining a pre-existing profile of a borehole (step 302). The pre-existing profile may include various measured and calculated information pertaining to the borehole and logging operation such as well logging data 304 that was obtained through the well logging operation. The pre-existing profile may also include a well dispersion response 306 of that borehole. The well dispersion response may be a Stoneley dispersion response, a flexural dispersion response, among others. The pre-existing well profile may also include the tool size used during the logging operation, formation type, the type of drilling fluid (mud) used, caliper, rock density, mud slowness, mud density, other conditions, or any combination thereof. In some embodiments, the pre-existing profile is obtained by accessing a database. The pre-existing profile may have been generated for a test logging operation or previous logging operation of a well. For example, a test logging operation may be performed on a homogeneous or isotropic formation. In either case, the physical logging tool 106 was used to perform the logging operation, and the logging tool 106 has a measurable dimension such as radius 202 (FIG. 2).

The method 300 further includes obtaining one or more well parameters from the known well data (step 304). In some embodiments, the well parameters may be calculated from the known well data. In some other embodiments, the well parameters may already have been generated and thus only need to be accessed. Examples of such well parameters include formation compressional slowness and formation shear slowness.

The method 300 also includes inputting the well logging data obtained in step 302 and a model tool size 310 into an equivalent tool model (step 308). However, rather than the model tool size 310 reflecting the actual tool size, in some embodiments, the model tool size 310 may be a reduction of the radius of the actual logging tool 106 used in the logging operation from which the well parameters were derived. For example, in some embodiments, the model tool radius used in the equivalent tool model may be 80% of the actual tool radius of the logging tool 106 used in the logging operation.

In some embodiments, the equivalent tool model may be a reduced rigid tool model, in which the tool size used in the model is smaller than the actual tool size and the tool is assumed to be substantially rigid. Specifically, the reduced tool model can be represented mathematically by equations 1.1-1.7. The general solution of an elastic wave equation in a cylindrical system and the displacement components can be expressed as $$\begin{Bmatrix} \Phi \\ \chi \\ \Gamma \end{Bmatrix} = \begin{cases} (A_n I_n(pr) + B_n K_n(pr))e^{ikz}\cos n\theta \\ (C_n I_n(sr) + D_n K_n(sr))e^{ikz}\sin n\theta \\ (E_n I_n(sr) + F_n K_n(sr))e^{ikz}\cos n\theta \end{cases} \quad (1.1)$$

$$\begin{cases} u = \frac{\partial \Phi}{\partial r} + \frac{1}{r}\frac{\partial \chi}{\partial \theta} + \frac{\partial^2 \Gamma}{\partial r \partial z} \\ v = \frac{1}{r}\frac{\partial \Phi}{\partial \theta} - \frac{\partial \chi}{\partial r} + \frac{1}{r}\frac{\partial^2 \Gamma}{\partial \theta \partial z} \\ w = \frac{\partial \Phi}{\partial z} + k_s^2 \Gamma + \frac{\partial^2 \Gamma}{\partial z^2} \end{cases} \quad (1.2)$$

where $k_p=\omega/\alpha$ and $k_s=\omega/\beta$ are the compressional and shear wavenumbers, and $\alpha$ and $\beta$ are the compressional and shear velocities, respectively; $\omega$ is the angular frequency; $p=\sqrt{k^2-k_p^2}$, and $s=\sqrt{k^2-k_s^2}$ are the compressional and shear radial wavenumbers, respectively; $\Phi$ is the compressional-wave potential; $\chi$ is the SV-type shear-wave potential; $\Gamma$ is the SH-type shear-wave potential; k is the axial wavenumber; u, v and w represent displacements in radial, azimuthal and axial direction, respectively.

By considering the boundary conditions between the tool and the mud as rigid, which means the displacement at the tool surface is zero and that there will be no wave propagating inside the tool. The corresponding equation could be expressed as:

$$u|_{r=R_0} = \rho_f(A_n^f H_1(fR_0) + B_n^f Y_1(fR_0))e^{ik(z-ct)}\cos(n\theta(\theta-\Phi))=0 \quad (1.3)$$

$R_0$ is the model tool radius and R is the borehole radius. For the interface between the mud and the formation, we consider it as an elastic boundary, where the displacement and the radial normal stress $\sigma_{rr}$ are continuous and the shear stress $\sigma_{rz}$ and $\sigma_{r\theta}$ are zero, as shown in (1.4):

$$\begin{cases} u = u_f \\ \sigma_{rr} = \sigma_{rrf} \\ \sigma_{rz} = 0 \\ \sigma_{r\theta} = 0 \end{cases}, (r=R) \quad (1.4)$$

So the governing equation becomes $$\begin{pmatrix} M_{11} & M_{12} & 0 & 0 & 0 \\ M_{21} & M_{22} & M_{23} & M_{24} & M_{25} \\ M_{31} & M_{32} & M_{33} & M_{34} & M_{35} \\ 0 & 0 & M_{43} & M_{44} & M_{45} \\ 0 & 0 & M_{53} & M_{54} & M_{55} \end{pmatrix} \begin{pmatrix} A_n^f \\ B_n^f \\ B_n^b \\ D_n^b \\ F_n^b \end{pmatrix} = \begin{pmatrix} 0 \\ u_f^d \\ \sigma_{rrf}^d \\ 0 \\ 0 \end{pmatrix}. \quad (1.5)$$

With the displacement-strain relationship and the Hook's law, the coefficients of the propagation equation could be derived as following:

$$M_{11} = \rho_f f H_1(fR_0); \; M_{12} = \rho_f f Y_1(fR_0); \quad (1.6)$$
$$M_{21} = -fH_1(fR); \; M_{22} = -fY_1(fR); \; M_{23} = p_b Y_1(p_b R);$$
$$M_{24} = \frac{n}{R}K_n(s_b R); \; M_{25} = iks_b Y_1(s_b R);$$
$$M_{31} = \rho_f \omega^2 I_n(fR); \; M_{32} = \rho_f \omega^2 K_n(fR);$$
$$M_{33} = \rho_b(2\beta_b^2 k^2 - \omega^2)K_n(p_b R) + \frac{2\rho_b \beta_b^2 p_b}{R}Y_2(p_b R)$$
$$M_{34} = -\frac{2n s_b \rho_b \beta_b^2}{R}Y_3(s_b R);$$
$$M_{35} = 2ik\rho_b \beta_b^2 s_b^2 K_n(s_b R) + \frac{2iks_b \rho_b \beta_b^2}{R}Y_2(s_b R)$$
$$M_{43} = 2ikp_b \rho_b \beta_b^2 Y_1(p_b R); \; M_{44} = \frac{ikn\rho_b \beta_b^2}{R}K_n(s_b R);$$
$$M_{45} = -s_b \rho_b \beta_b^2 (s_b^2 + k^2) Y_1(s_b R)$$
$$M_{53} = \frac{2np_b \rho_b \beta_b^2}{R}Y_3(p_b R); \; M_{54} = -\rho_b \beta_b^2 s_b^2 Y_4(s_b R);$$
$$M_{55} = \frac{2iks_b n\rho_b \beta_b^2}{R}Y_3(s_b R)$$

Where $$H_1(x) = \frac{n}{x}I_n(x) + I_{n+1}(x); \; Y_1(x) = \frac{n}{x}K_n(x) - K_{n+1}(x) \quad (1.7)$$
$$H_2(x) = \frac{n(n-1)}{x}I_n(x) - I_{n+1}(x);$$
$$Y_2(x) = \frac{n(n-1)}{x}K_n(x) + K_{n+1}(x)$$
$$H_3(x) = \frac{1-n}{x}I_n(x) - I_{n+1}(x); \; Y_3(x) = \frac{1-n}{x}K_n(x) + K_{n+1}(x)$$
$$H_4(x) = \left[1 + \frac{2n(n-1)}{x^2}\right]I_n(x) - \frac{2}{x}I_{n+1}(x);$$
$$Y_4(x) = \left[1 + \frac{2n(n-1)}{x^2}\right]K_n(x) + \frac{2}{x}K_{n+1}(x)$$

By taking the determinant of the propagation matrix M and looking for the zeros of det(M) along a given frequency range, an estimated dispersion response 314 can be generated (step 312).

Given the well dispersion response of the pre-existing well profile, the accuracy of the estimated dispersion response can be measured by comparing it against the well dispersion response (step 316). The goal is for the estimated dispersion response to be as close as possible to the known well dispersion response. An estimated dispersion response with high accuracy to the actual dispersion response indicates that the equivalent tool model with the respective model tool size 310 can be effectively used in data processing analyses. Experiments have shown that varying the model tool radius value, $R_0$, changes the estimated dispersion response. Thus the method includes fitting the estimated dispersion response to the known well dispersion response by adjusting (i.e., increasing or decreasing) the model tool size (e.g., radius value) (step 318).

In some embodiments, the model tool size is adjusted until the error between the estimated dispersion response and the known well dispersion response is below a certain threshold. In some other embodiments, multiple estimated dispersion responses are generated using different model tool size values, and the model tool size value associated with the estimate dispersion response with the highest fidelity to the known well dispersion response is selected (step 320). The selected model size may then be saved in a memory device or transmitted and can be used to process logging data from other logging operations (step 322). For example, well log data from a second logging operation and the selected model tool size can be used with an equivalent tool model, such as a rigid tool model to obtain a second estimated dispersion response. Furthermore, the selected model size can be utilized in various other data processing steps to determine reservoir properties of other boreholes. Ultimately, one or more well operations such as drilling and completions, hydrocarbon recovery, and the like, are performed based on the reservoir properties. For example, the reservoir properties can be used to determine if a specific wellbore is a good candidate for becoming a production well, how to form the well, what type of equipment to use, what type of fluid is expected to be recovered, among other information.

The selected model tool radius value may be associated with the formation type, mud type, or a formation-mud combination type of the logging operation. This process may be repeated several times, using well data from different logging operations with different conditions, to build a table or reference associating a range of various well/logging conditions (e.g., formation type, mud type) to optimum model tool radius values. Furthermore, an ideal reduction rate can be derived from this data that dictates a relationship between the model tool size or radius and the actual tool size or radius.

If an ideal reduction rate or model tool radius is known for a particular new logging operation, then the reduced rigid model can be used to generate a dispersion response for the new logging operation. The method of doing so includes obtaining one or more parameters of the well. The one or more parameters are derived from acoustic data measured by a logging tool, a set of known well parameters, or both. The one or more well parameters may include formation compressional slowness, formation shear slowness, caliper, rock density, mud slowness, mud density, or any combination thereof.

The one or more well parameters and a model tool size are inputted into the reduced rigid tool model, such as described in equations 1.1-1.7 above, in which the model tool size entered is different than the actual tool size. In some embodiment, the model tool size is reduced from the actual tool size by a certain predetermined reduction rate. In some other embodiments, the model tool size is a predetermined value. The model tool size or the reduction rate is may be chosen based on the formation type, the mud type, or other well characteristic that is associated with an ideal reduction rate or model tool size value. An estimated dispersion response can then be generated from the rigid tool model.

The dispersion response may be a Stoneley dispersion response or a flexural dispersion response.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method of logging, comprising:
   accessing a database to obtain a pre-existing well profile of a borehole, the well profile comprising:
   well logging data obtained by a logging tool having an actual tool size; and
   a well dispersion response of the borehole;
   inputting the well logging data and a model tool size into an equivalent tool model;
   generating an estimated dispersion response from the equivalent tool model;
   adjusting the model tool size input into the equivalent tool model to fit the estimated dispersion response to the well dispersion response;

selecting the model tool size value or with which the estimated dispersion response is most similar to the well dispersion response; and storing the selected model tool size, a ratio between the selected model tool size and the actual tool size, or both, on a memory device or transmitting the selected model tool size to a recipient.

2. The method of claim 1, comprising determining reservoir properties for another borehole based on the equivalent tool model using the selected model tool size value.

3. The method of claim 2, comprising performing one or more well operations based on the reservoir properties.

4. The method of claim 1, comprising:
performing a logging operation using the logging tool, wherein the logging tool is conveyed downhole;
receiving second well logging data from the logging tool or a second logging tool;
inputting the second well logging data and the selected model tool size value into the equivalent tool model; and
generating a second dispersion response a well model from the equivalent tool model.

5. The method of claim 1, wherein the well logging data comprises a Stoneley waveform, a flexural waveform, or both.

6. The method of claim 1, wherein the well profile comprises formation compressional slowness, formation shear slowness, caliper, rock density, mud slowness, mud density, a formation type, a mud type, or any combination thereof.

7. The method of claim 1, wherein the model tool size is a model tool radius and the actual tool size is an actual tool radius.

8. The method of claim 7, further comprising associating the selected model tool size with the formation type, the mud type, or a formation-mud type.

9. The method of claim 1, wherein the model tool size is smaller than the actual tool size.

10. A method of logging, comprising:
obtaining well logging data collected by a logging tool, wherein the logging tool has an actual tool size;
inputting the well logging data and a model tool size into an equivalent tool model, wherein the model tool size is a set value independent of the actual tool size or a certain percentage of the actual tool size;
generating an estimated dispersion characteristic of the borehole from the equivalent tool model;
calculating an error rating associated with the estimated dispersion characteristic;
adjusting the model tool size value until the error rating is below a certain error rating threshold or a minimum error rating is found; and
selecting a new model tool size correlated with the error rating threshold or the minimum error rating.

11. The method of claim 10, wherein the well logging data includes a formation type, a mud type, or both, and the model tool size is determined based on the formation type, the mud type, or both.

12. The method of claim 10, wherein the well logging data includes formation compressional slowness, formation shear slowness, caliper, rock density, mud slowness, mud density, or any combination thereof.

13. The method of claim 10, wherein the dispersion characteristic is a Stoneley dispersion response or a flexural dispersion response.

14. The method of claim 10, wherein the model tool size is smaller than the actual tool size.

15. The method of claim 10, wherein the model tool size is a model tool radius and the actual tool size is an actual tool radius.

16. The method of claim 10, further comprising performing a logging operation with the logging tool.

17. A method of logging, comprising:
accessing a database to obtain a pre-existing well profile of a borehole, the well profile comprising:
well logging data obtained by a logging tool having an actual tool size; and
a well dispersion response of the borehole;
inputting the well logging data and a model tool size into an equivalent tool model;
generating an estimated dispersion response from the equivalent tool model;
comparing the estimated dispersion response to the well dispersion response;
calculating an error rating between the estimated dispersion response and the dispersion response;
adjusting the model tool size value until the error rating is below a certain error rating threshold or a minimum error rating is found;
selecting the model tool size correlated with the error rating threshold or the minimum error rating; and
storing the selected model tool size on a memory device or transmitting the selected model tool size.

18. The method of claim 17, wherein the equivalent tool model is based on a rigid tool model.

19. The method of claim 17, wherein the model tool size is smaller than the actual tool size.

20. The method of claim 17, wherein the model tool size is a model tool radius, and the actual tool size is an actual tool radius.

21. The method of claim 17, further comprising:
determining reservoir properties for another borehole based on the tool model using the selected model tool size value; and
performing one or more well operations based on the reservoir properties.

* * * * *